United States Patent [19]

Rea et al.

[11] Patent Number: 5,061,997
[45] Date of Patent: Oct. 29, 1991

[54] CONTROL OF VISIBLE CONDITIONS IN A SPATIAL ENVIRONMENT

[75] Inventors: Mark S. Rea; William L. Glennie, both of Rensselaer; Inderpreet S. Thukral, Glenmont, all of N.Y.

[73] Assignee: Rensselaer Polytechnic Institute, Troy, N.Y.

[21] Appl. No.: 541,340

[22] Filed: Jun. 21, 1990

[51] Int. Cl.[5] .............................................. H04N 7/18
[52] U.S. Cl. .................................... 358/108; 364/550; 340/825.06; 340/541
[58] Field of Search ................ 358/108, 105; 364/550, 364/145; 340/825.06, 541, 540

[56] References Cited

U.S. PATENT DOCUMENTS

| | | | |
|---|---|---|---|
| 4,198,653 | 4/1980 | Kamin | 358/108 |
| 4,458,266 | 7/1984 | Mahoney | 358/105 |
| 4,567,557 | 1/1986 | Burns | 540/825.06 |
| 4,652,862 | 3/1987 | Verslycken | 358/108 |
| 4,737,847 | 4/1988 | Araki | 358/105 |
| 4,774,570 | 9/1988 | Araki | 358/105 |
| 4,924,416 | 5/1990 | Sasao | 358/108 |

Primary Examiner—Howard W. Britton
Assistant Examiner—Michael H. Lee
Attorney, Agent, or Firm—John F. McDevitt

[57] ABSTRACT

Apparatus for the control of visible conditions in various spatial environments is disclosed along with a method for operating said apparatus. The apparatus employs programmed central controller means to distribute control signals to remote devices for an adjustment of various local environment conditions. The control signals are developed in a novel manner employing optical means with the output signals therefrom being processed to provide visual information based upon segmenting the visual image into spatial regions and further processing these data signals to reflect the relative light contribution from light sources in the spatial environment being regulated. Typical controller apparatus operating by such means can adjust illumination in the building as well as further provide occupancy or fire detection.

32 Claims, 3 Drawing Sheets

CONTROL OF VISIBLE CONDITIONS IN A SPATIAL ENVIRONMENT

BACKGROUND OF THE INVENTION

This invention relates generally to control means for adjustment of visible conditions in an environment which employs visual information and more particularly, to a novel apparatus and method for doing so employing optical imaging means.

Visual information provides an effective means to exercise control of environmental conditions in several respects. For example, a visual image of a building room being observed enables the spatial characteristics of visible objects therein to be determined as well as determining brightness levels (luminace) within said enclosure. It follows that a visual image for such building space provides both spatial and luminance information useful in controlling various lighting and other environmental conditions within the localized enclosure. Such visual image can be used as a means for regulating artificial illumination or natural illumination as well as detecting and responding to occupancy of such localized enclosure. In such type environment, processing of the acquired visual image enables control of artificial or natural light sources to be exercised for such purposes as work conferences, focused light projection, desk work and still other objectives. In other end applications of the same type, a pattern recognition concept is adopted whereby the acquired visual image can be employed for response to such varied conditions as intrusion, fire outbreak and power failure. Alarm means operatively associated with the latter type imaging process can thereby provide notice of such detected visible conditions within the building enclosure.

In U.S. patent application Ser. No. 07/263,023, entitled "A Photometric Device" filed Oct. 27, 1988, in the name of co-inventor, Mark Stanley Rea, there is disclosed solid state video camera means to acquire a visual image containing improved light (luminance) and spatial information. A measure of relative visual performance is determined by such means employing three stimulus variables contained in the captured image, namely, the age dependent adaptation luminance and apparent contrast of the target image against its background together with apparent physical size of said target image. Thus, said overall device carries out both image acquisition and image processing to still further include color discrimination or identification and to such an improved degree as to closely resemble that obtainable with the human eye. The illustrated photometric device is further said to include visual display means enabling a user to locate target objects in the particular space being viewed. As such, this device is said to comprise:

(a) a video camera having a pixel sensor array and known pixel value output signals relative to a black reference zero light value storage element in the sensor array, in response to the spatial-light intensity information being viewed by the camera, the camera having a low geometric distortion, (b) filter means on the variable aperture lens for, in operation, transforming the camera spectral sensitivity to match a known spectral sensitivity, (c) an image acquisition board connected to the output from the camera and having a spatial resolution closely related to that of the camera, the board having a dc restoration circuit for correcting any drift in the camera output signal, a pixel value programmable gain and offset amplifier, and means for storing the pixel values in digital form in a frame memory spatial array, (d) a video target viewer connected to the camera, and (e) means connected to the output of the image acquisition board for computing visual angle and scaling the pixel output signals for computing contrast from the absolute value in relation to a predetermined light intensity received by the camera, and providing a substantially constant and linear relationship capability between the input luminance and pixel value output signals over substantially the entire pixel sensor array and light range of operation.

It is desirable, as previously mentioned, to exercise control of many visible conditions occurring within the particular environmental space being regulated to include both closed and open spaces. It is further desirable to do so by central control means enabling remote devices to be automatically controlled responsive to visible conditions being observed. For example, such centralized control means can provide control of artificial illumination means for a room, such as incandescent, fluorescent and discharge lamp devices responsive to the localized lighting requirements, such as hereinbefore indicated, and do so in an energy efficient manner which accounts for natural light sources when applicable. It becomes still further desirable for such centralized control means to recognize visible conditions other than lighting levels and lighting locations which can occur within the particular spatial environment being regulated and respond to such localized parameters as intrusion and fire outbreak. Thus, while various centralized control systems are already known which can respond to all of the foregoing environmental conditions, it remains still desirable to exercise such control more effectively with control means making particular use of better visual information obtained from the particular spatial environment being regulated.

SUMMARY OF THE INVENTION

It now has been discovered that visible conditions within an observed spatial environment can be both effectively and efficiently adjusted or regulated by making particular use of the visual information obtained from the environment being observed. More particularly, control signals for the operation of various remote devices are obtained from a central location with a particular visual image derived from a predetermined space wherein conditions are to be controlled. A suitable visual image can be obtained with optical means such as the photometric means hereinbefore mentioned to provide digital output data signals that are further processed in a particular manner for subsequent development of the desired control signals. To still further illustrate said novel control method according to one aspect of the present invention, the essential steps comprise:

(a) forming a visual image for a predetermined environmental space with optical means digitizing the visual image to provide output data signals representative thereof, (b) segmenting the digital output data signals into spatial regions of the visual image, (c) further processing the data signals from selected segmented regions to reflect the relative light contribution from selected light sources in the environmental space being viewed, and (d) developing control signals from the processed data signals at a central location to enable an adjustment of said visible conditions to be made therefrom.

For optimum performance in the foregoing manner, the processing of data signals from selected segmented regions includes light contribution for each segmented region from all signficant light sources present in the environmental space being viewed. In accordance with said defined general method, the development of such control signals with central programmed controller means enables distribution of the control signals therefrom to operate various remote controlled devices operatively coupled thereto. Thus, control signals that are being operated by initial processing of the visual image obtained in the foregoing manner can serve such varied objectives as regulating lighting levels within the observed spatial environment or actuating alarm means should the environment develop undesired conditions. It is to be further understood, however, that such initial processing of the digital output signals can still further include already known data processing means for the removal of extraneous noise signals from the acquired image.

In one aspect of the present invention, suitable apparatus means to conduct the above defined control method generally requires:

(a) optical means forming a visual image for a predetermined environmental space and providing digital output data signals representative thereof, (b) central programmed controller means enabling said digital output data signals to be segmented into spatial regions of the visual image while further processing the data signals from selected segmented regions to reflect the relative light contribution from selected light sources in the environmental space being viewed, (c) the central programmed controller means including a mathematical processor unit, permanent memory storage means providing instruction whereby control signals enabling adjustment of visible conditions in the environmental space being viewed are developed, temporary memory storage means for temporarily storing the digital output data signals under control of the mathematical processor unit and permanent memory storage means, and input/output means for transmitting the digital output data signals to the temporary storage means while further enabling digital data communication between the central programmed controller means and a remote location, and (d) at least one remote device being operated by distribution of the control signals.

In connection with the defined apparatus means it is further contemplated that remote sensor devices will prove useful, such as ambient temperature sensors and photocells for sensing local ambient light conditions, together with known analog to digital conversion means enabling acquisition by the central programmed controller means of such analog sensor information. Likewise, it is still further contemplated to operatively associate known digital to analog conversion means with said controller means for the conversion of digital control signals when controlling the operation of such remote analog devices as motorized window shades of a particular building enclosure or closed space being viewed. It should be further understood that "input/output means" suitable for employment in the present apparatus represents already known data bus configurations providing any information-signal path, regardless of the nature or type of signal or information being carried. Employment of such apparatus means thereby permits control of various power consuming local devices at remote locations in a novel improved manner to include on-off switch actuated devices as well as load devices involving variable power consumption. Understandably, such apparatus means further enables remote device control responsive to changes in both local and external environmental conditions with respect to said illustrative building enclosure or space. The above generally defined method and apparatus still further contemplates a parallel distribution of the central signals to a plurality of the controlled devices which can be achieved with further incorporation of conventional distributed processor means in the central controller while allowing the mathematical processor unit to contribute processing of input visual as well as other sensor data signals.

For implementation of the above generally defined apparatus means, commercially available computer camera means can be employed to continuously acquire a digitized visual image for input to a compatible desktop type digital computer. An Electrim Model EDC-1000 computer camera is thereby contemplated for such image acquisition as a more compact and inexpensive alternative to the video camera system previously disclosed. Said camera means can directly supply digital output data signals representative of an acquired visual image to a commercially available IBM Model PC/XT/AT machine or other compatible like computer means for automated development therein of the desired control signals. There need only be further operatively associated with such representative equipment combination means other conventional software and hardware peripheral devices (such as above mentioned) to either enable data communication with the illustrated computer device or to enable automated control of the remote devices being employed. In the former regard, the EDC-1000 camera means is reported to employ software now requiring a minimum of double density 5¼ inch floppy disk drive RAM and PC/MS-DOS version 2.1 higher. In the latter regard, conventional control hardware devices being contemplated may include both sensory input devices including analog-to-digital converters, binary inputs, pulse counters and the like as well as output control devices such as digital-to-analog converters, voltage regulators, circuit modules, pulse and binary outputs, etc.

In accordance with a different aspect of the present invention, a method and apparatus means are provided enabling the control signals to be programmably established employing intelligent knowledge based program means. Such modification can be carried out with the above generally defined central programmed controller means having a stored logic program already exercising control of the visible environmental conditions by further detecting and processing changes found in the visual image beyond that permitted under said logic control program. To do so, the defined central programmed controller means stores both logic and knowledge based programs for processing of the digital output signals being simultaneously communicated to each program in a continuous manner. If the knowledge based program detects a visible condition warranting a change in the brightness condition or conditions being maintained with said logic program, then such change is communicated to the logic program for automated establishment of such change therein together with subsequent maintenance by said logic program of the newly established brightness condition or conditions.

A typical programmable system incorporating such modification thereby comprises:

(a) optical means forming a visual image for a predetermined environmental space and providing digital output data signals representative thereof, (b) central programmed controller means enabling said digital output data signals to be initially processed by segmentation into spatial regions of the visual image while further processing the data signals from selected segmented region to reflect the relative light contribution from selected light sources present in the environmental space being viewed, (c) the central programmed controller means including a mathematical processor unit, permanent memory storage means providing instruction whereby control signals enabling adjustment of visible conditions in the environmental space being viewed are developed with the initially processed digital signals, temporary memory storage means for temporarily storing input digital signals under control of the mathematical processor unit and permanent memory storage means, and input/out means for transmitting the digtial output data signals to the temporary memory storage means while further enabling digital data communication between the central programmed controller means and a remote location, (d) the permanent memory storage means including logic program means regulating operation of at least one remote device with the control signals responsive to certain commands of the mathematical processor unit, (e) the permanent memory storage means also including an intelligent knowledge based program means which cooperates with said logic program means in a manner whereby the control signals being developed with said logic program can be further adjusted automatically responsive to said knowledge based program means, and (f) local control means enabling said remote device to be operated by distribution of the control signals.

Essential hardware and software components for a representative control system embodying the above defined cooperating logic and knowledge based program means are further described hereinafter to include a further description of the specific program steps involved.

DETAILED DESCRIPTION OF THE PREFERRED EMBODIMENTS

Figure 1:
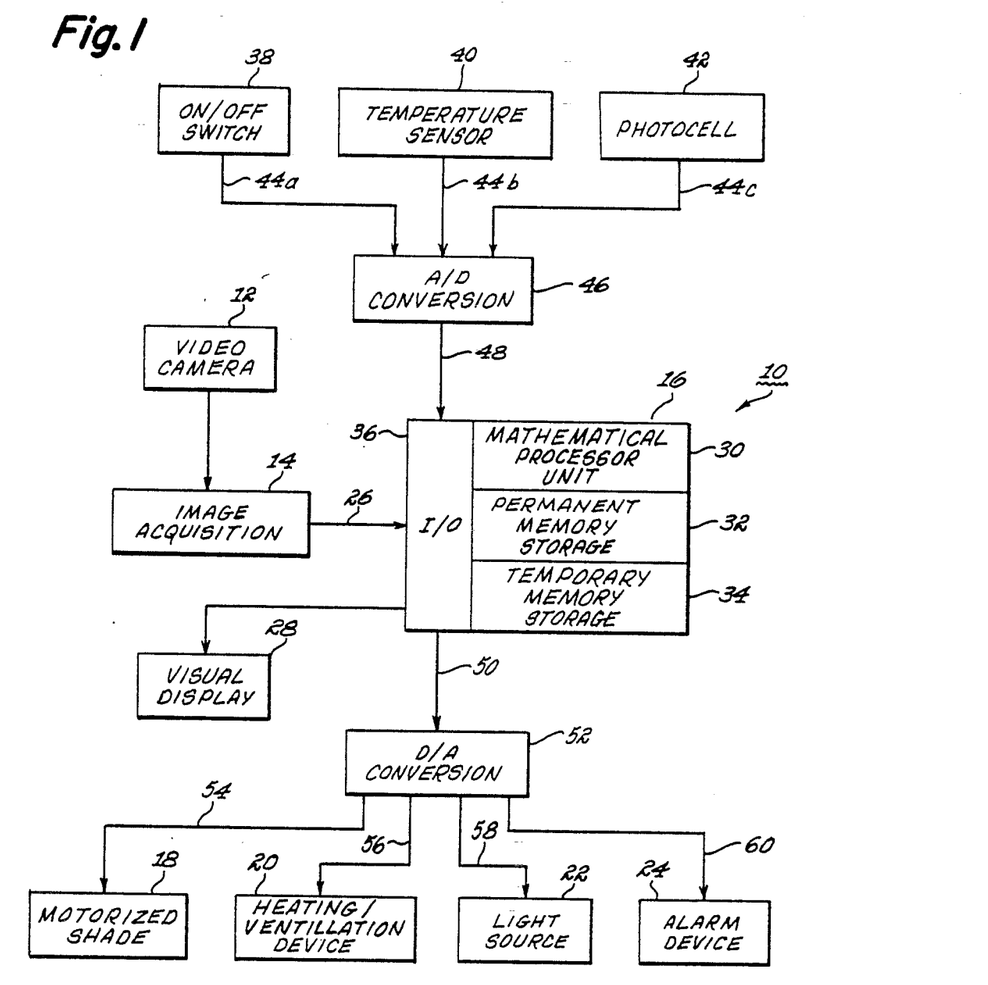
FIG. 1 is a schematic block diagram for a typical control system according to the present invention in which a plurality of remote lood sources are individually controlled responsive to visual information processed at a central location.

Referring to the drawings, FIG. 1 is a schematic block diagram of representative apparatus means employing visual information to control operation of various load devices. Accordingly, said control system 10 includes a video camera 12 having image acquisition means 14 to digitize the camera image, central programmed controller means 16 and a plurality of remote controlled devices 18, 20, 22 and 24 operatively associated with the central controller means. Video camera 12 preferably has the construction further described in the aforementioned Ser. No. 07/263,023 application (which is hereby entirely incorporated by reference into the present application so as to obviate herein any further detailed description thereupon). Image acquisition means 14 digitizes the camera image preferably employing the structural configuration further described in the aforementioned co-pending patent application to provide digitized output data signals 26 representative of said camera image which are transmitted to the central controller means 16. Optional video dispplay means 28 are also shown to be operatively associated with said image acquisition means 14 so as to enable user interaction with the particular control system being illustrated for such purposes as object location within an illustrative building enclosure being viewed or detecting events taking place therein. Central controller means 16 includes mathematical processor unit 30, permanent memory storage means 32 providing instruction whereby control signals enabling adjustment of the controlled devices 18-24 to be made, temporary memory storage means 34 for receipt of the input digital output signals 26 under control of the mathematical processor unit 30 and permanent memory stroage means 32, and input/output means 36 of conventional configuration for transmitting the digital output data signals 26 to the central controller means while further enabling digital data communication between said central controller means 16 and the various remote locations. Said remote locations can be seen to include the controlled devices 18-24 as well as various other input sensor devices 38, 40 and 42 cooperating with the particular control system being illustrated to still further adjust environmental conditions within a representative building enclosure. In the latter regards, analog sensor signals 44a, 44b and 44c provide input signals to conventional analog to digital (A/D) conversion means 46 via data bus connection which can include any known bus means including coaxial cable, twisted wire pair, optical fiber, radio communication link and the like. The digital signals 48 from conversion means 46 are also connected to the central controller 16 by such data bus means. Digital output control signals 50 from said central controller are provided by such means to conventional digital to analog (D/A) conversion means 52 for subsequent distribution to the particular analog type devices 18-24 being controlled thereby. Thus, converted analog control signals 54 are shown to be connected to motorized drive means for a remotely located window shade device 18 with similar analog control signals 56 being furnished to local control means (not shown) for conventional heating or cooling device 20 associated with the particular enclosure being illustrated. Likewise, further analog control signals 58 can be furnished to conventional lighting devices 22, such as lamp-ballast combinations, while remaining analog control signals 60 are shown to be connected to conventional alarm means 24. It should be understood, however, that a direct distribution of the digital control signals 50 to still other type remote devices is herein contemplated when such devices can be operated or actuated in the same manner as is well known in the art.

In operation, the illustrated control means 10 automatically adjusted lighting and/or other environmental conditions within the building enclosure by first forming the visual image with said video camera means and providing digital output data signals representative thereof to the central controller, then initially processing these digital output data signals by said controller means to segment the visual image into selected spatial regions which further reflect the luminous intensity found in the selected segmented regions and the luminous contribution being made to the selected segment regions by selected light sources, thereafter further internally developing control signals with the processed data signals through modified operation of an internal logic program contained within the central controller, and distributing the control signals to the remote devices being controlled thereby. Suitable logic program means providing control signals in the foregoing manner employs a computational association matrix formed between the defined luminous intensities which is further explained in the following FIG. 2 description. In connection with the operation of the control system being illustrated in the present drawing, however, such preselected logic program stored in the permanent memory storage means of the central controller 16 operates continuously to control the environmental conditions by means of some or all of the depicted remote devices 18-24 within defined limits. A further interface of converted output signals from sensor devices 38-42 assists in maintaining the environmental conditions within the building enclosure to remain below the maximum limits set in the preselected logic program. The processed digital output data signals being derived with the camera image enables such programmed control of these environmental conditions to be altered in several ways. Since any visible change occurring in said premises is detected by the processed digital output data signals to include occupancy of said premises, electrical power failure, fire and ambient light levels, a modification can be made by the programmed control of said environment responsive thereto. For example, any detection of fire occurrence by the herein illustrated control means enables actuation of the included alarm device and can terminate electrical power otherwise being supplied pursuant to the logic program dictates. Detection of permise occupants both as to number of occupants and their respective locations can also enable an adjustment of illumination means for the premises other than being dictated under the logic program controls. Additionally, it becomes further possible in accordance with the control means to be further described in the following FIG. 3 embodiment to monitor visible events occurring within the premises being viewed by means of a second intelligent knowledge based program and thereafter generate control signals responsive to excess variation in the environmental conditions beyond that being permitted under the logic program herein being employed.

Figure 2:
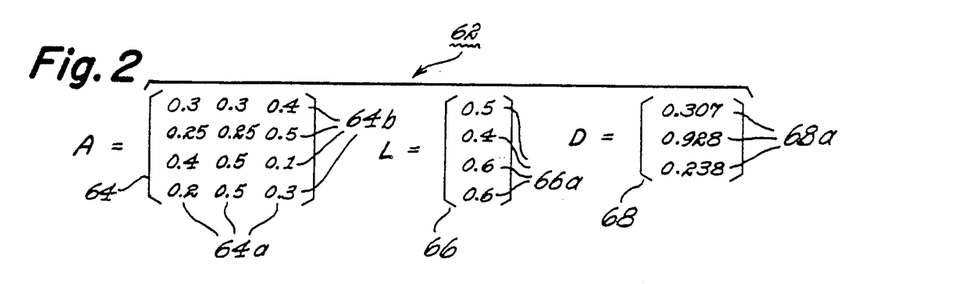
FIG. 2 is a representative computational association matrix for a suitable logic program in the FIG. 1 control system.

FIG. 2 is a computational association matrix 62 enabling development of a linear control program in the customary manner for storage in the memory storage means 32 of the above defined control system 10. More particularly, the illustrated control arrangement automatically adjusts artificial illumination conditions being provided with light source 22 and/or natural illumination conditions being provided with motorized shade device device 18 to a desired luminous intensity level with respect to the selected segmented regions. In developing said association matrix 62, it is first assumed foir simplicity for explanation that the representative building enclosure being observed has been segmented into three spatial regions and which is being illuminated only with four artificial light sources. The A matrix 64 illustrated in the present drawing is formed with numerals representing brightness values in terms of recognized "nits" units measured in each spectral region. Such brightness values are developed by first turning all light sources on to measure the maximum level which each segment can achieve. All light sources are next turned off followed by turning each light source on one at a time and measuring the extent of light contribution from each light source to every segmented region as normalized by the maximum brightness level achieved in that particular segmented region. Accordingly, the individual columns 64a in said matrix depict the derived measured values of brightness being provided to each of the three segmented regions by the individual light sources whereas the individual rows 64b in said matrix depict the corresponding amount of brightness being provided to an individual segmented region by these four light sources. The L matrix 66 depicts fractions of brightness 66a which can be provided by each light source to the individual segmented regions and with said values constrained in the range 0-1 so that negative values or values greater than 1 do not occur when solving the depicted computational association matrix with this control program means. The D matrix 68 depicts the desired brightness levels in each segmented region again expressed as fractions 68a of the maximum brightness level which can be acheived in the particular segmented region with the light sources being employed. The control algorithm solved with the foregoing association matrix by logic program means is as follows:

$$AL = D$$

Thus, a desired level of brightness can be automatically maintained in the responsive segmented regions selected within the maximum and minimum brightness levels established by said program means. It can be further appreciated in connection with a routine formulation of said logic control program that available natural brightness sources provide a means to reduce the amount of artificial illumination needed to achieve a desired level of illumination. It follows from such consideration that corresponding fractions of the available natural illumination can be derived for adjustment of the artificial illumination fractions found in the above L matrix when utilizing the above defined logic control program.

The specific numerical values listed in the FIG. 2 computational association matrix can now be further explained. The listed A matrix values were obtained by having all four artificial light sources involved being tunred on to maximum brightness level thereby producing maximum in the individual segmented regions. The listed D matrix values represent desired brightness levels for each of said four light sources. The resulting L values being listed were derived by conventional matrix computation applying the hereinabove provided control algorithm together with a further constraint that said values all reside in the range 0-1.

Figure 3:
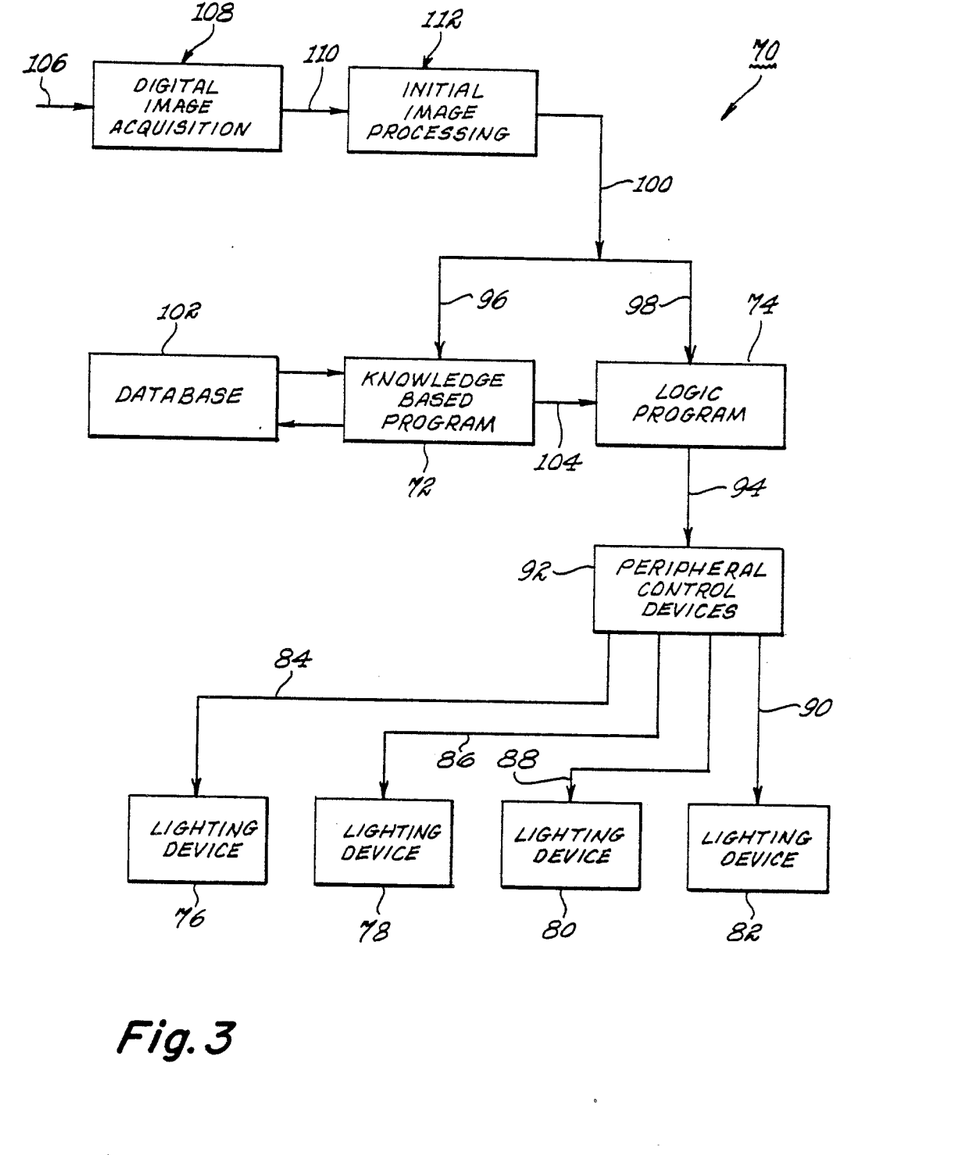
FIG. 3 is a representative system block diagram depicting essential hardware and software features required for automated control of lighting conditions with the combined logic and knowledge based programmed meas of the present invention.

In FIG. 3 there is depicted a representative system block diagram for essential apparatus and software means 70 enabling automated control of remote lighting devices from a central location. The depicted control system employs a knowledge based program 72 in combination with a logic program 74 to vary said lighting conditions responsive to processed data signals being continuously monitored with each of said program means. Accordingly, a plurality of various centrally-controlled lighting devices 76, 78, 80 and 82 being employed to adjust illumination within a representative building space (not shown) are provided with individual control signals 84, 86, 88 and 90, respectively, being supplied thereto with conventional serial coprocessor means or by means of still other known peripheral control devices 92. Said control signals are distributed by conventional data bus connection 94 after generation in central programmed controller means (not shown) having a generally similar construction to that employed in the previous FIG. 1 embodiment. Thus, both knowledge base program 72 and logic program 74 are stored in the permanent memory storage means of a selected digital computer device for the cooperative action further depicted in the present drawing. Duplicate data signals 96 and 98 are simultaneuously supplied to the respective stored programs for said purpose from a common conventional information-signal path 100. In so doing, data signals 98 enables logic program 74 to develop control signals for automated regulation of the lighting devices being controlled. Supplying corresponding data signals 96 to knowledge base program 72 enables detection therein with further cooperation of an associated data base 102 of any need for change in the brightness levels otherwise being automatically maintained with logic program 74. The detection of any need for such change in the knowledge based program 72 automatically provides logic program 74 with a new set of brightness conditions or levels employing further data signals supplied by an interconnected information signal path 104. The duplicate data signals 96 and 98 enabling such combined operation of multiple program means can be derived in the same manner as employed in the preceding embodiment to initially process the digital output data signals representative of an acquired visual image. In accordance therewith, a visual image 106 is acquired by suitable digital image acquisition means 108 providing the digital output data signals 110 representative thereof to the selected digital computer device (not shown) wherein said data signals are segmented with software means 112 into spatial regions of the building space being observed which each further reflects the maximum brightness contribution from the four lighting devices herein being employed.

Basic operation of the present control embodiment is as follows: the visual image formed with a selected image acquisition means, such as the previously identified computer camera, provides digital output data signals which are transmitted to the central programmed controller already exercising control of the visible environmental conditions with the logic program means, the digital output data signals being initially processed by said central controller to segment the visual image into selected spatial regions which further reflect the luminous intensity found in the selected segmented regions and the luminous contribution being made to the selected segmented regions by selected light sources, next generating first control signals with the processed digital output data signals to enable automated maintenance of maximum and minimum brightness levels within the building space being regulated, automatically changing said maintained brightness levels with second control signals generated responsive to the further associated knowledge based program, and thereafter maintaining the newly established brightness levels responsive to said second control signals. In accordance with said defined method, user interaction can also be employed to either establish a novel control algorithm for automated control of environmental conditions within the premises being viewed based upon the rules found in the knowledge based program means as well as to select from a number of control algorithms already found in the logic program means. It is still further contemplated for implementation of the herein control embodiment that a user will first employ the defined control apparatus to programmably establish the particular "rule-base" and control algorithm of the knowledge based program means.

Figure 4:
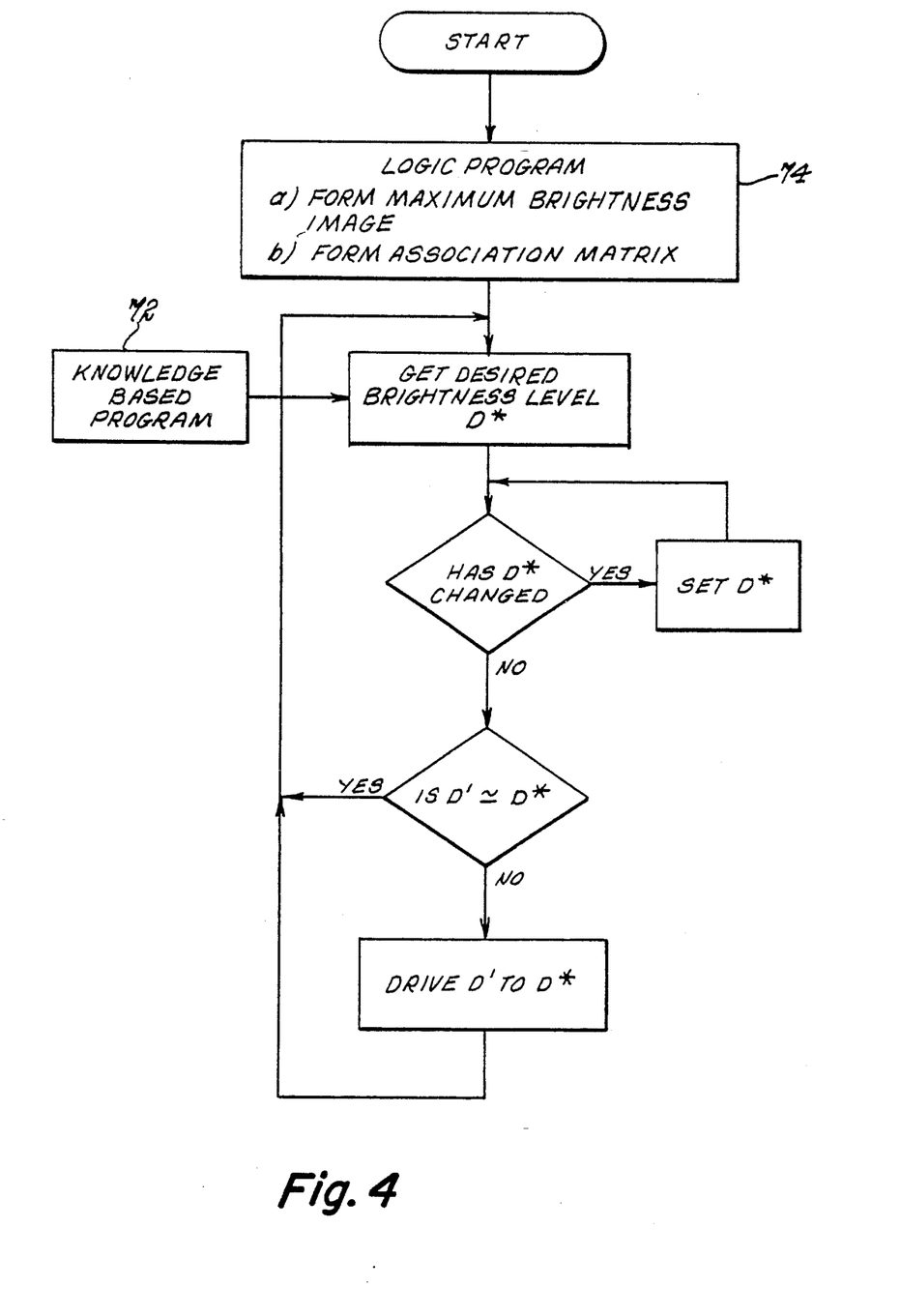
FIG. 4 is a representative flow chart enabling operation of the FIG. 3 control system.

FIG. 4 is a representative flow chart further explaining typical operation of the overall FIG. 3 control system. More particularly, a preprogrammed instruction chart for said entire control system is illustrated whereby knowledge based program 72 can automatically override the control of brightness levels being exercised with logic program 74. The flow chart consists of a series of routines continuously recycled through the central programmed controller means (not shown) while the control is continually energized by connection to a conventional power source. The overall control program initializes with a suitable logic program, such as previously described in connection with the preceding FIG. 2 embodiment, whereby a desired brightness level is first established by said program having minimum and maximum brightness levels. Said programmed brightness level is next automatically changed to a $D^*$ value by the knowledge based program 72 in response to visible events occurring within the room being observed. In a first subroutine, the brightness levels of the controlled lighting devices are automatically changed for correspondence with the $D^*$ brightness value if found to reside outside the established maximum and minimum brightness levels. In a second subroutine, the desired $D^*$ value is compared with the actual brightness levels $D'$ being experienced at the selected segmented regions in said room enclosure with changes again being made in the brightness levels of the controlled lighting devices for correspondence of the actual brightness level conditions with the desired $D^*$ value.

It will be apparent form the foregoing description that broadly useful control means have been provided by which visual information is utilized for adjustment of visible conditions in various spatial environments. While present preferred embodiments for said control means have been described, it will be apparent to those skilled in the art that many variations and modifications thereto can be made without departing from the spirit and scope of this invention. For example, there exists a great variety of devices which can be actuated by control signals to operate load devices, including on-off switch mechanisms and the like, as well as solid state control modules for such purpose. Accordingly, it is intended to limit the present invention only by the scope of the appended claims rather than by specific details or instrumentalities described herein.

What we claim as new and desire to secure by Letters Patent of the United States is:

1. A method for adjusting visible conditions within a predetermined spatial environment comprising the steps of:
   (a) forming a visual image of the visible conditions for a predetermined spatial environment with optical imaging means digitizing the visual image to provide digital output data signals representative thereof,
   (b) segmenting the digital output data signals into spatial regions of the visual image,
   (c) further processing the data signals from selected segmented regions to reflect the relative light contribution from selected light sources in the environmental space being viewed, and
   (d) developing control signals from the processed data signals at a central location to enable adjustment of said visible conditions to be made therefrom, the control signals being developed with logic program means employing a computational association matrix having the mathematical relationship:

$$AL = D$$

wherein A is a first matrix representing the brightness values detected in the individual spatial regions for individual light sources, L is a second matrix representing the brightness fraction being provided by each light source over the range 0–1, and D is a third matrix representing the desired brightness value in each spatial region as a fraction of the maximum brightness value achievable with the available light sources.

2. The method of claim 1 wherein the control signals adjust artifical illumination means.

3. The method of claim 1 wherein the control signals adjust natural illumination means.

4. The method of claim 1 wherein the control signals actuate alarm means.

5. The method of claim 1 wherein the control signals are further made responsive to external environmental conditions.

6. The method of claim 1 wherein the control signals adjust illumination means selectively with respect to segmented regions.

7. The method of claim 1 wherein the digital output data signals are processed and distributed with programmed controller means.

8. The method of claim 7 wherein the distributed control signals are programmably established to adjust at least one light source operatively coupled to said controller means.

9. The method of claim 7 wherein the distributed control signals are programmably established to actuate alarm means operatively coupled to said controller means.

10. The method of claim 8 wherein the adjustment of the light source is further made responsive to ambient environmental conditions.

11. The method of claim 10 wherein certain control signals operate remote ambient light sources.

12. A method for adjusting visible conditions within a predetermined spatial environment comprising the steps of:
    (a) forming a visual image for a predetermined spatial environment with optical means digitizing the visual image to provide digital data output signals representative thereof,
    (b) transmitting the digital output data signals to central programmed controller means having a preselected logic program enabling the digital output data signals to be segmented into spatial regions of the visual image while further processing the data signals from selected segmented regions to reflect the relative light contribution from selected light sources in the environmental space being viewed, the logic program employing a computational association matrix having the mathematical relationship:

$$AL = D$$

wherein A is a first matrix representing the brightness values detected in the individual spatial regions for individual light sources, L is a second matrix representing the brightness fraction being provided by each light source over the range 0–1, and D is a third matrix representing the desired brightness value in each spatial region as a fraction of the maximum brightness value achievable with the available light sources,
    (c) regulating brightness levels in the environmental space being viewed with control signals being generated by the logic program with said processed data signals, and
    (d) continuously monitoring the processed data signals by means of an operatively associated knowledge based program means for automatic adjustment of said control signals.

13. The method of claim 12 wherein the same processed data signal values are communicated to each program in a continuous manner.

14. An apparatus to control visible conditions within a predetermined environmental space which comprises:
    (a) optical imaging means to form a visual image of said spatial environment having image acquistion means digitizing the visual image to provide digital output data signals representative thereof,
    (b) central programmed controller means enabling said digital output data signals to be segmented into spatial regions of the visual image while further processing the data signals from selected segmented regions to reflect the relative light contribution from selected light sources in the environmental space being viewed,
    (c) the central programmed controller means including a mathematical processor unit, permanent memory storage means providing instruction whereby control signals enabling adjustment of visible conditions in the environmental space being viewed are developed, temporary memory storage means for temporarily storing the digital output data signals under control of the mathematical processor unit and permanent memory storage means, and input/output means for transmitting the digital output data signals to the temporary storage means while further enabling digital data communication between the central programmed controller means and a remote location, the control signals being developed with a stored logic program employing a computational association matrix having the mathematical relationship:

$$AL = D$$

wherein A is a first matrix representing the brightness values detected in the individual spatial regions for individual light sources, L is a second matrix representing the brightness fraction being provided by each light source over the range 0–1, and D is a third matrix representing the desired brightness value in each spatial region as a fraction of the maximum brightness value achievable with the available light sources, and (d) at least one remote device being operated by distribution of the control signals.

15. The apparatus of claim 14 wherein the remote device provides artificial illumination.

16. The apparatus of claim 14 wherein the remote device provides natural illumination.

17. The apparatus of claim 14 wherein the control signals are further made responsive to external environmental conditions.

18. The apparatus of claim 14 which further includes visual display means assisting a user to interact with the central programmed controller means.

19. The apparatus of claim 14 wherein the central programmed controller means further includes serial coprocessor means enabling distribution of the control signals while the mathematical processor unit is developing control signals.

20. The apparatus of claim 17 wherein remote sensor devices communicate with the central programmed controller means.

21. An apparatus to control visible environmental conditions with in a preselected building space which comprises:

(a) optical imaging means to form a visual image of said building space having image acquisition means digitizing the visual image to provide digital output data signals representative thereof, (b) central programmed controller means enabling said digital output data signals to be segmented into spatial regions of the visual image while further processing the data signals from selected segmented regions to reflect the relative light contribution from selected light sources in the building space being viewed, (c) the central programmed controller means including a mathematical processor unit, permanent memory storage means containing a preselected logic program whereby control signals enabling adjustment of visible environmental conditions in the building space being viewed are automatically developed, temporary memory storage means for temporarily storing the digital output data signals under control of the mathematical processor unit and permanent memory storage means, and input/output means for transmitting the digital output data signals to the temporary memory storage means while further enabling digital data communication between the central programmed controller means and a remote location, the preselected logic program employing a computational association matrix having the mathematical relationship;

$$AL = D$$

wherein A is a first matrix representing the brightness values detected in the individual spatial regions for individual light sources, L is a second matrix representing the brightness fraction being provided by each light source over the range 0–1, and D is a third matrix representing the desired brightness value in each spatial region as a fraction of the maximum brightness value achievable with the available light sources, (d) the permanent memory storage means further including an intelligent knowledge based program means cooperating with said logic program in developing the control signals, and (e) at least one remote device being operated by distribution of the control signals.

22. The apparatus of claim 21 further including remote sensor means enabling the control signals to reflect external environmental conditions.

23. The apparatus of claim 21 wherein the remote device is an artificial light source.

24. The apparatus of claim 21 wherein the remote device is a source of natural illumination.

25. The apparatus of claim 21 wherein the remote device is alarm means.

26. The apparatus of claim 21 employing a plurality of remote devices providing artificial illumination which are controlled by a user to adjust both the lighting level and location of illumination in the building space being viewed.

27. The apparatus of claim 21 wherein the intelligent knowledge based program means automatically adjust control signals being generated with the logic program means.

28. The apparatus of claim 21 wherein the optical imaging means comprises a computer camera device.

29. A programmable system to control visible conditions within a building space which comprises:

(a) computer camera means to acquire a digitized visual image of said building space and provide digital output data signals representative thereof, (b) central programmed controller means enabling said digital output data signals to be initially processed with a preselected logic program utilizing a mathematical relationship formed between the brightness levels found in selected spatial regions of the visual image and the luminous contribution being made to the selected spatial regions by selected light sources to develop control signals for adjustment of brightness levels in the building space being viewed, the preselected logic program employing a computational association matrix having the mathematical relationship:

$$AL = D$$

wherein A is a first matrix representing the brightness values detected in the individual spatial regions for individual light sources, L is a second matrix representing the brightness fraction being provided by each light source over the range 0–1, and D is a third matrix representing the desired brightness value in each spatial region as a fraction of the maximum brightness value achievable with the available light sources, (c) the central programmed controller means including a mathematical processor unit, permanent memory storage means for storage of said preselected logic program and responsive to commands of the mathematical processor unit, temporary memory storage means for temporarily storing input digital signals under control of the mathematical processor unit and permanent memory storage means, and input/output means for transmitting the digital output data signals to the temporary memory storage means while further enabling digital data communication between the central programmed controller means and a remote location, (d) the permanent memory storage means further including an intelligent knowledge based program enabling automatic adjustment of the control signals being generated with said logic program for conformity with brightness levels being established by said knowledge based program, and (e) local control means enabling at least one remote device to be operated by distribution of the control signals.

30. The system of claim 29 which further includes remote sensor means enabling the control signals to reflect external environmental conditions.

31. The system of claim 30 which further includes analog to digital conversion means enabling acquisition of analog sensor information.

32. The system of claim 29 which further includes digital to analog conversion means enabling conversion of digital control signals for operation of a remote analog device.

* * * * *